(12) United States Patent
Cucu-Grosjean et al.

(10) Patent No.: US 11,748,530 B2
(45) Date of Patent: Sep. 5, 2023

(54) DEVICE FOR CHARACTERISING AND/OR MODELLING WORST-CASE EXECUTION TIME

(71) Applicant: INRIA INSTITUT NATIONAL DE RECHERCHE EN INFORMATIQUE ET EN AUTOMATIQUE, Le Chesnay (FR)

(72) Inventors: Liliana Cucu-Grosjean, Versailles (FR); Adriana Gogonel, Le Plessis Robinson (FR)

(73) Assignee: INRIA INSTITUT NATIONAL DE RECHERCHE EN INFORMATIQUE ET EN AUTOMATIQUE, LeChesnay (FR)

( * ) Notice: Subject to any disclaimer, the term of this patent is extended or adjusted under 35 U.S.C. 154(b) by 600 days.

(21) Appl. No.: 16/621,379

(22) PCT Filed: Jun. 6, 2018

(86) PCT No.: PCT/FR2018/051310
§ 371 (c)(1),
(2) Date: Dec. 11, 2019

(87) PCT Pub. No.: WO2018/229392
PCT Pub. Date: Dec. 20, 2018

(65) Prior Publication Data
US 2020/0159974 A1    May 21, 2020

(30) Foreign Application Priority Data
Jun. 12, 2017 (FR) .................................... 1755208

(51) Int. Cl.
*G06F 30/20* (2020.01)
*G06N 7/01* (2023.01)
(Continued)

(52) U.S. Cl.
CPC ............... *G06F 30/20* (2020.01); *G06N 7/01* (2023.01); *G06F 2111/10* (2020.01); *G06F 2119/12* (2020.01)

(58) Field of Classification Search
CPC ...... G06F 30/20; G06F 2119/12; G06N 7/005
(Continued)

(56) References Cited

U.S. PATENT DOCUMENTS 8,209,701 B1 * 6/2012 Roytman ............... G06F 9/5027
                                                            718/106
8,316,368 B2 * 11/2012 Vestal ................... G06F 9/4881
                                                            718/105
(Continued)

FOREIGN PATENT DOCUMENTS

FR        3033431 A1    9/2016

OTHER PUBLICATIONS

Lichen Zhang (Worst Case Timing Analysis For Real-Time programs, IEEE, 1997, pp. 960-963) (Year: 1997).*
(Continued)

*Primary Examiner* — Iftekhar A Khan
(74) *Attorney, Agent, or Firm* — Maynard Nexsen PC; Brian T. Sattizahn (57) ABSTRACT

A computer device for characterising execution time by a processor, comprising a memory (8) which receives benchmark program data, sets of characterisation configuration data and sets of execution case data, and a constructor (4) which determines, for each set of execution case data, a set of worst-case configuration data of the processor and a set of initialisation values based on a set of execution case data, and determining a reference execution time by executing the benchmark program according to the set of execution case data using the processor configured with the set of configuration data with the set of initialisation values, all the (Continued)

reference execution times forming a set of reference execution times. The constructor (4) determines, for each set of characterisation configuration data, a set of characterisation execution times comprising a number of characterisation execution times equal to the number of elements of the set of reference execution times and each characterisation execution time being determined by executing the benchmark program using the processor configured with a set of characterisation configuration data and with a set of initialisation values representing the benchmark program and the processor. The constructor (4) determines a set of characterisation coefficients by applying an algorithm for determining the maximum likelihood between the set of reference execution times (M0) and the sets of characterisation execution times (M[k]), and the device returns the set of characterisation configuration data and the set of characterisation coefficients.

10 Claims, 3 Drawing Sheets

(51) Int. Cl.
*G06F 111/10* (2020.01)
*G06F 119/12* (2020.01)

(58) Field of Classification Search
USPC .............................................................. 703/2
See application file for complete search history.

(56) References Cited

U.S. PATENT DOCUMENTS

| | | | |
|---|---|---|---|
| 8,756,044 B2* | 6/2014 | Mani | G06F 8/10 |
| | | | 703/13 |
| 9,477,928 B2* | 10/2016 | Rajan | G06F 11/3604 |
| 10,733,526 B2* | 8/2020 | Nogayama | G06N 20/00 |
| 2004/0006584 A1* | 1/2004 | Vandeweerd | G06F 9/5066 |
| | | | 718/107 |
| 2004/0010785 A1* | 1/2004 | Chauvel | G06F 11/3419 |
| | | | 717/148 |
| 2005/0010907 A1* | 1/2005 | Namjoshi | G06F 30/3323 |
| | | | 717/124 |
| 2005/0166095 A1* | 7/2005 | Chander | G06F 9/44589 |
| | | | 714/E11.22 |
| 2010/0131958 A1* | 5/2010 | Cazorla Almeida | G06F 11/3466 |
| | | | 718/104 |
| 2012/0284732 A1* | 11/2012 | Griglock | G06F 9/5066 |
| | | | 718/104 |
| 2013/0036423 A1* | 2/2013 | McCready | G06F 9/5066 |
| | | | 718/103 |
| 2013/0166271 A1* | 6/2013 | Danielsson | G06F 30/20 |
| | | | 703/22 |
| 2014/0059524 A1* | 2/2014 | Kee | G06F 8/49 |
| | | | 717/154 |
| 2014/0122848 A1* | 5/2014 | Easwaran | G06F 9/4887 |
| | | | 712/E9.016 |
| 2014/0149325 A1* | 5/2014 | Clifton | G05B 23/024 |
| | | | 706/12 |
| 2016/0055032 A1* | 2/2016 | David | G06F 11/0793 |
| | | | 718/107 |
| 2016/0247081 A1* | 8/2016 | Zaykov | G06N 7/01 |
| 2018/0173622 A1* | 6/2018 | Fruechtenicht | G06F 12/0866 |
| 2018/0210978 A1* | 7/2018 | Cucu-Grosjean | G06F 30/20 |
| 2020/0089476 A1* | 3/2020 | Verhaeghe | G06F 8/38 |

OTHER PUBLICATIONS

Jakob Engblom (Processor Pipelines and Static Worst-Case Execution Time Analysis, Acta Universitatis Upsaliensis, 2002, pp. 1-130) (Year: 2002).*

Colin et al. (Worst Case Execution Time Analysis for a Processor with Branch Prediction, Kluwer Academic Publishers, 2000, pp. 249-274) (Year: 2000).*

Kim et al. (Efficient Worst Case Timing Analysis of Data Caching, IEEE, 1996, pp. 230-240) (Year: 1996).*

Xianfeng, et al., "Modeling Out-of-Order Processors for Software Timing Analysis," 25th IEEE International Real-Time Systems Symposium, 2004, pp. 92-103.

Santinelli, et al., "Revising Measurement-Based Probabilistic Timing Analysis," IEEE Real-Time and Embedded Technology and Applications Sympoism, 2017, pp. 199-208.

Wartel, et al., "Measurement-Based Probablistic Timing Analysis: Lessons from an Integrated-Modular Avionics Case Study," 8th IEEE International Symposium on Industrial Embedded Systems, 2013, pp. 241-248.

Kosmidis, et al., "Measurement-Based Probablistic Timing Analysis and its Impact on Processor Architecture," 17th IEEE Euromicro Conference on Digital System Design, 2014, pp. 401-410.

* cited by examiner

DEVICE FOR CHARACTERISING AND/OR MODELLING WORST-CASE EXECUTION TIME

BACKGROUND OF THE INVENTION

The invention relates to the field of the design of embedded systems and the simulation of their operation.

More particularly, the invention finds its application in the design of critical embedded systems. Critical embedded systems exhibit the particular feature of being designed in such a way as to not experience any fault and/or to exhibit a very high tolerance in case a fault should occur. For example, the resources of these systems are doubled, tripled, or indeed multiplied tenfold, so as to ensure redundancy in the case of a breakdown of one of the elements, as well as to ensure that all the calculations that these systems are responsible for carrying out are terminated in the desired times.

Historically, technological progress has been sufficient to make up for the growing complexity of these systems. Stated otherwise, the increase in power available for the processors of embedded systems rendered design simple: it sufficed to oversize the driver with a considerable coefficient so as to guarantee the integrity of all embedded systems, whether they be avionics, aerospace, automotive or railroad systems.

In recent years, two combined effects have changed this paradigm.

On the one hand, although the powers of drivers are continuing to grow in a regular manner, this growth has slowed down and is tending to slow down still more as the fineness of etching increases. This is increased by the fact that electrical consumption and heat liberated are criteria which have become crucial, whereas this was not the case for earlier drivers.

Moreover, great strides have been made in terms of physical modeling and practical application of embedded systems, and their applications demand a calculation power which has increased greatly, and which tends to grow more quickly than the increase in the power of processors.

A need therefore exists to produce a device which allows better sizing of the needs of embedded systems in terms of calculation power.

In French patent application FR 15 51828, the Applicant has proposed a simulation device and a method which make it possible to evaluate in a precise manner a "worst-case" execution time with a chosen degree of certainty.

This constitutes a significant advance in the field, but requires a set of input data which sufficiently characterizes the processor and the program for which the worst-case execution time is sought. To produce these execution times, it is therefore necessary to execute the program on the processor an extremely considerable number of times, possibly in excess of 100 000 runs. The set of input data for these executions forms part of program definition domain on the respective processor. This definition domain often being too wide to be completely visited, it is possible to call upon schemes using random methods (for example Monte-Carlo) to choose a set of data of this same domain. Each set of input data extends characteristics of a processor and of a given program, it is therefore necessary to relaunch the production of the set of input data each time that a new program is considered.

BRIEF SUMMARY OF THE INVENTION

The invention aims to improve the situation. To this effect, the invention proposes a computer device for characterizing execution time by a processor, comprising a memory arranged to receive benchmark program data, sets of characterization configuration data and sets of execution case data, and a constructor arranged, for each set of execution case data, to determine a set of worst-case configuration data of the processor and a set of initialization values on the basis of a set of execution case data, and to determine a reference execution time by executing the benchmark program according to the set of execution case data by the processor configured with the set of configuration data with the set of initialization values, the whole collection of reference execution times forming a set of reference execution times.

The constructor is furthermore arranged, for each set of characterization configuration data, to determine a set of characterization execution times, each set of characterization execution times comprising a number of characterization execution times which is equal to the number of elements of the set of reference execution times and each characterization execution time being determined by executing the benchmark program by the processor configured with a set of characterization configuration data and with a set of initialization values which is representative of the benchmark program and of the processor, and to determine a set of characterization coefficients by applying an algorithm for determining the maximum likelihood between the set of reference execution times and the sets of characterization execution times.

Finally, the device is arranged to return the set of characterization configuration data and the set of characterization coefficients.

According to diverse variants, the device can exhibit one or more of the following characteristics:
  the constructor is arranged to calculate the characterization coefficients by determining, for each set of characterization execution times, a plurality of estimation vectors wherein, for each index, the value is zero or equals one if the characterization execution time of index is the closest to the reference execution time for this index from among all the characterization execution times for this index, as well as a variance for each set of characterization execution times on the basis of the plurality of estimation vectors and of the differences between the reference execution times and the characterization execution times of identical indices, and thereafter by calculating iteratively on the basis of a sliding window comprising for each iteration and for each set of characterization execution times a number of execution times which is equal to the number of elements of the set of reference execution times and which are the most recent:
    a plurality of estimators for the current iteration, on the basis of a plurality of normal distributions for each set of characterization execution times which have in common a variance derived from that of the previous iteration, and whose mean is derived on each occasion from a characterization execution time selected by the sliding window of the current iteration, which normal distributions are each evaluated at the execution time of the set of reference execution times which corresponds to that on the basis of which the mean is determined,
    a variance and a characteristic coefficient for each set of characterization execution times on the basis of the estimator of the current iteration, of the differences between the reference execution times and the characterization execution times of identical indices selected by the sliding window of the current iteration, and the number of elements of the set of reference execution times, a new characterization execution time for each set of characterization execution times by applying a normal distribution whose variance is that calculated for each set of characterization execution times for the current iteration and whose mean is the characterization execution time of highest index in the sliding window, which normal distribution is evaluated at the execution time of the set of reference times of highest index in the sliding window, and a new reference execution time on the basis of the new characterization execution times for each set of characterization execution times and of the characteristic coefficients for each set of characterization execution times for the current iteration, the iterations being repeated until a condition pertaining to the number of iterations or to a difference between the characterization coefficients for each set of characterization execution times of consecutive iterations is fulfilled, the set of characterization coefficients being defined on the basis of the characterization coefficients of the last iteration, the constructor is arranged to calculate the estimators according to the following formula:

$$z(j)(k,i) = N, sig(j-1)(k)^2) / \Sigma_{i=j}^{T+j-1} N, sig(j-1)(k)^2)$$

where each z is an element of index i in the estimator z, N designates the normal distribution with mean m and variance s, $M_k$ designates the execution time of index i in the k-th set of characterization execution times, sig is the variance for the k-th set of characterization execution times and $M_0$ designates the execution time of index i in the set of reference execution times, the constructor is arranged to calculate the variances according to the following formula:

$$sig(j)(k)^2 = \Sigma_{i=j}^{T+j-1}(z)(j)(k,i) * (M_0(i) - M_k(i))^2) / \Sigma_{i=j}^{T+j-1} z(j)(k,i)$$

where z is the element of index i in the estimator z for the k-th set of characterization execution times, $M_k$ designates the execution time of index i in the k-th set of characterization execution times, and $M_0$ designates the execution time of index i in the set of reference execution times, the constructor is arranged to calculate the characterization coefficients according to the following formula:

$$alph(j)(k) = \Sigma_{i=j}^{T+j-1} z(j)(k,i) / T$$

where z is the element of index i in the estimator z for the k-th set of characterization execution times and T is the number of elements of the set of reference execution times $M_0$, the constructor is arranged to calculate the new characterization execution times according to the following formula:

$$M_k = N, sig(j-1)(k)^2)$$

where N designates the normal distribution with mean m and variance s, $M_k$ designates the execution time of index i in the k-th set of characterization execution times, and sig is the variance for the k-th set of characterization execution times, and the constructor is arranged to calculate the new reference execution time according to the following formula:

$$M_0(T+j) = \sum_{k=1}^{K} alph(k) M_k$$

where $M_0$ designates the execution time of index i in the set of reference execution times, Mk designates the execution time of index i in the k-th set of characterization execution times, and alph is the characterization coefficient associated with the k-th set of characterization execution times in the j-th iteration.

The invention also relates to a device for calculating a base of worst-case execution times of a program by a processor comprising a memory arranged to receive program data, sets of characterization configuration data and a set of characterization coefficients which is obtained by the execution of the device described above, and a modeler arranged to:

determine a plurality of sets of initialization values for each set of characterization configuration data, the number of sets of initialization values being the same for all the sets of characterization configuration data, determine a plurality of execution times by executing the program by the processor configured with each set of characterization configuration data and with on each occasion the corresponding plurality of sets of initialization values, and add to a base of worst-case execution times a plurality of worst-case execution times, which are each equal to the sum for each of the sets of characterization configuration data of the product of one of the execution times by the characterization coefficient associated with the set of characterization configuration data which made it possible to obtain this execution time, so that the base of worst-case execution times comprises a number of execution times which is equal to the number of sets of initialization values for each set of characterization configuration data.

According to diverse variants, the device can exhibit one or more of the following characteristics:

the modeler is furthermore arranged to extrapolate worst-case execution times, and the modeler is furthermore arranged to determine a worst-case execution time with a corresponding probability by applying a pWCET algorithm to the base of worst-case execution times.

The invention also relates to a method for characterizing execution time by a processor, comprising the following operations:

a) receive benchmark program data, sets of characterization configuration data and sets of execution case data, b) for each set of execution case data, determine a set of worst-case configuration data of the processor and a set of initialization values on the basis of a set of execution case data, and determine a reference execution time by executing the benchmark program according to the set of execution case data by the processor configured with the set of configuration data with the set of initialization values, the whole collection of reference execution times forming a set of reference execution times, c) for each set of characterization configuration data, determine a set of characterization execution times, each set of characterization execution times comprising a number of characterization execution times which is equal to the number of elements of the set of reference execution times and each characterization execution time being determined by executing the benchmark program by the processor configured with a set of characterization configuration data and with a set of initialization values which is representative of the benchmark program and of the processor, d) determine a set of characterization coefficients by applying an algorithm for determining the maximum likelihood between the set of reference execution times and the sets of characterization execution times, and e) return the set of characterization configuration data and the set of characterization coefficients.

According to diverse variants, the method can exhibit one or more of the following characteristics:

operation d) comprises calculating the characterization coefficients by determining, for each set of characterization execution times, a plurality of estimation vectors wherein, for each index, the value is zero or equals one if the characterization execution time of index is the closest to the reference execution time for this index from among all the characterization execution times for this index, as well as a variance for each set of characterization execution times on the basis of the plurality of estimation vectors and of the differences between the reference execution times and the characterization execution times of identical indices, and thereafter by calculating iteratively on the basis of a sliding window comprising for each iteration and for each set of characterization execution times a number of execution times which is equal to the number of elements of the set of reference execution times and which are the most recent:

a plurality of estimators for the current iteration, on the basis of a plurality of normal distributions for each set of characterization execution times which have in common a variance derived from that of the previous iteration, and whose mean is derived on each occasion from a characterization execution time selected by the sliding window of the current iteration, which normal distributions are each evaluated at the execution time of the set of reference execution times which corresponds to that on the basis of which the mean is determined, a variance and a characteristic coefficient for each set of characterization execution times on the basis of the estimator of the current iteration, of the differences between the reference execution times and the characterization execution times of identical indices selected by the sliding window of the current iteration, and the number of elements of the set of reference execution times, a new characterization execution time for each set of characterization execution times by applying a normal distribution whose variance is that calculated for each set of characterization execution times for the current iteration and whose mean is the characterization execution time of highest index in the sliding window, which normal distribution is evaluated at the execution time of the set of reference times of highest index in the sliding window, and a new reference execution time on the basis of the new characterization execution times for each set of characterization execution times and of the characteristic coefficients for each set of characterization execution times for the current iteration, the iterations being repeated until a condition pertaining to the number of iterations or to a difference between the characterization coefficients for each set of characterization execution times of consecutive iterations is fulfilled, the set of characterization coefficients being defined on the basis of the characterization coefficients of the last iteration, operation d) comprises calculating the estimators according to the following formula:

$$z(j)(k,i)=N,sig(j-1)(k)^2)/\Sigma_{i=j}^{T+j-1} N,sig(j-1)(k)^2)$$

where each z is an element of index i in the estimator z, N designates the normal distribution with mean m and variance s, $M_k$ designates the execution time of index i in the k-th set of characterization execution times, sig is the variance for the k-th set of characterization execution times and $M_0$ designates the execution time of index i in the set of reference execution times, operation d) comprises calculating the variances according to the following formula:

$$sig(j)(k)^2=\Sigma_{i=j}^{T+j-1}(z(j)(k,i)*(M_0(i)-M_k(i))^2)/\Sigma_{i=j}^{T+j-1} z(j)(k,i)$$

where z is the element of index i in the estimator z for the k-th set of characterization execution times, $M_k$ designates the execution time of index i in the k-th set of characterization execution times, and $M_0$ designates the execution time of index i in the set of reference execution times, operation d) comprises calculating the characterization coefficients according to the following formula:

$$alph(j)(k)=\Sigma_{i=j}^{T+j-1} z(j)(k,i)/T$$

where z is the element of index i in the estimator z for the k-th set of characterization execution times and T is the number of elements of the set of reference execution times $M_0$, operation d) comprises calculating the new characterization execution times according to the following formula:

$$M_k=N,sig(j-1)(k)^2)$$

where N designates the normal distribution with mean m and variance s, $M_k$ designates the execution time of index i in the k-th set of characterization execution times, and sig is the variance for the k-th set of characterization execution times, and operation d) comprises calculating the new reference execution times according to the following formula:

$$M_0(T+j) = \sum_{k=1}^{K} alph(k) M_k$$

where $M_0$ designates the execution time of index i in the set of reference execution times, Mk designates the execution time of index i in the k-th set of characterization execution times, and alph is the characterization coefficient associated with the k-th set of characterization execution times in the j-th iteration.

The invention also relates to a method for calculating a base of worst-case execution times of a program by a processor comprising a) receiving program data, sets of characterization configuration data and a set of characterization coefficients which is obtained by the execution of the device or of the method described above, b) determining a plurality of sets of initialization values for each set of characterization configuration data, the number of sets of initialization values being the same for all the sets of characterization configuration data, c) determining a plurality of execution times by executing the program by the processor configured with each set of characterization configuration data and with on each occasion the corresponding plurality of sets of initialization values, and d) adding to a base of worst-case execution times a plurality of worst-case execution times, which are each equal to the sum for each of the sets of characterization configuration data of the product of one of the execution times by the characterization coefficient associated with the set of characterization configuration data which made it possible to obtain this execution time, so that the base of worst-case execution times comprises a number of execution times which is equal to the number of sets of initialization values for each set of characterization configuration data.

According to diverse variants, the method can exhibit one or more of the following characteristics:

e) extrapolate worst-case execution times, and e1) determine a worst-case execution time with a corresponding probability by applying a pWCET algorithm to the base of worst-case execution times.

BRIEF DESCRIPTION OF THE SEVERAL VIEWS OF THE DRAWINGS

Other characteristics and advantages of the invention will become better apparent on reading the description which follows, derived from examples which are given by way of nonlimiting illustration and are derived from the drawings in which.

The drawings and the description hereinafter contain, in essence, elements of a definite character. They will therefore be able not only to serve to better elucidate the present invention, but also to contribute to its definition, if relevant.

DETAILED DESCRIPTION OF THE INVENTION

The present description is of such a nature as to involve elements liable to protection by author's rights and/or copyright. The owner of the rights does not have any objection to the identical reproduction by anyone of the present patent document or of its description, such as it appears in the official records. For the remainder, it reserves its rights in full.

Furthermore, the detailed description is augmented by annex A, which gives the formulation of certain mathematical formulae implemented within the framework of the invention. This Annex is set apart with the aim of clarification, and to facilitate cross-references. It is an integral part of the description, and will therefore be able not only to serve to better elucidate the present invention, but also to contribute to its definition, if relevant.

Figure 1:
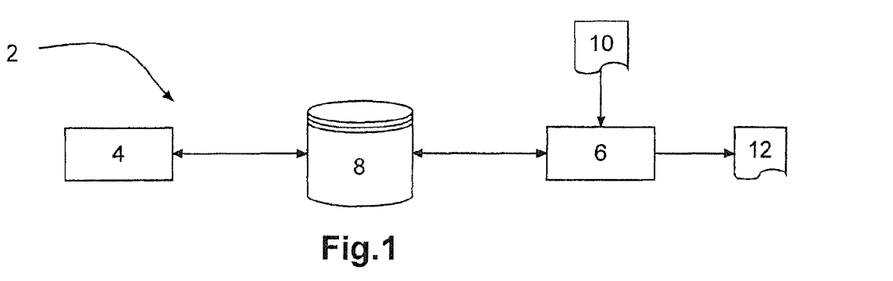
FIG. 1 represents a schematic diagram of a device according to invention.

FIG. 1 represents a device 2 according to the invention in its environment. The device 2 comprises a constructor 4, a modeler 6 and a memory 8.

Within the framework of the invention, the memory 8 can be any type of data storage suitable for receiving digital data: hard disk, flash-memory hard disk (SSD in English), flash memory in any form, random-access memory, magnetic disk, locally distributed or cloud storage, etc. The data calculated by the device can be stored on any type of memory similar to the memory 8, or on the latter. These data can be erased after the device has performed its tasks or preserved.

The data stored in the memory 8 are program data to be tested, sets of processor factors and n-tuples representing times of execution of a given program by a processor configured with a given set of factors. In the example described here, these data are calculated by the modeler 6. As a variant, they could be obtained differently. The data stored in the memory 8 could also be arranged in another form.

The constructor 4 and the modeler 6 are elements accessing the memory 8 directly or indirectly. They can be embodied in the form of an appropriate computer code executed on one or more processors. By processors, must be understood any processor suited to the calculations described below. Such a processor can be embodied in any known way, in the form of a microprocessor for personal computer, of a dedicated chip of FPGA or SoC type ("system on chip" in English), of a calculation resource on a grid, of a microcontroller, or of any other form suitable for providing the calculation power necessary for the embodiment described below. One or more of these elements can also be embodied in the form of specialized electronic circuits such as an ASIC. A combination of processor and of electronic circuits can also be envisaged.

The function of the constructor 4 is the determination of a set of coefficients stored in a vector alph[ ]. This set of coefficients is determined on the basis of a benchmark program for a processor that it is sought to characterize, as well as for a set of processor factors which is chosen for the processor that it is sought to characterize.

Indeed, a processor can be characterized by certain factors which will affect its manner of operation. For example, these factors can be the activation state of one or of several of the cores of the processor and/or their operating frequency, the operating state of one or more low-level random-access memories, the operating state of the one or of several of the communication buses within the processor, the operating state of the one or of several of the buffer memories of the processor, the activation state of specific functions for data processing, etc.

In what follows, the constructor 4 will determine a worst-case execution time data set for the benchmark program for the given processor in a worst-case configuration, as well as for each of the sets of processor factors. Thereafter, the set of coefficients will be calculated so as to represent a correspondence between the execution time data sets associated with each of the sets of processor factors and the set of worst-case execution times.

The role of the modeler 6 is the utilization of the set of coefficients. Thus, the modeler 6 receives simulation data 10 comprising program data to be rated, the program to be rated being considered to be sufficiently similar to the benchmark program. The data of simulations 10 are used with the sets of processor factors to determine execution time data sets of the program to be rated for each of the sets of processor factors, and then the set of coefficients is used to generate a worst-case execution time data set for the program to be rated.

This worst-case execution time data set can thereafter be extended in a synthetic manner so as to generate a large number of execution times which are characteristic of the execution of the program to be rated by the given processor under worst-case conditions. These extended data are stored in worst-case data 12 which can be used in accordance with what was described in French patent application FR 15 51828 (or in another way) to determine a worst-case execution time by the given processor for the program to be rated.

The time to obtain the worst-case execution time data set and its extension is much shorter than the time that would be necessary for the direct acquisition of execution time for this same program by executing it on the given processor for the whole collection of events.

Thus, the modeler 6 makes it possible to obtain a worst-case execution time data set comprising a very large number of data in a much faster way than was possible previously. This is achieved by carrying out the most intensive quantity of calculations just once to calculate the set of coefficients, and reusing them to make it possible to rate all the subsequent programs, provided that they are sufficiently similar to the benchmark program.

According to the variants, the device 2 can comprise the constructor 4 and the modeler 6 together, or just one of them. In particular, the modeler 6 could receive, in addition to the simulation data 10, data containing the set of coefficients as well as the sets of processor factors.

As a variant, the device of the invention can be used in applications other than the determination of "worst-case" time of a task by a processor, provided that it entails studying the taking of extreme values of a physical parameter. Just like the other elements, the constructor 4 and the modeler 6 can be embodied in very many ways and be, for example, coded in the form of a computer program.

Figure 2:
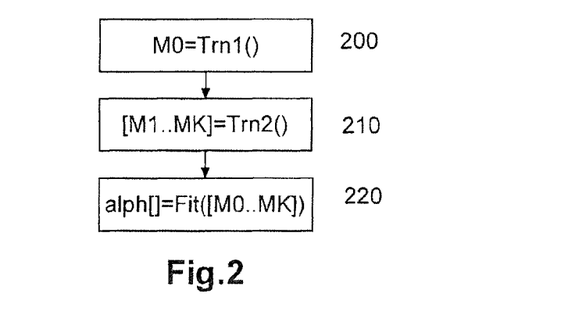
FIG. 2 represents an exemplary implementation of a function by an element of FIG. 1.

FIG. 2 represents an example of a function implemented by the constructor 4 to calculate the set of coefficients.

Figure 3:
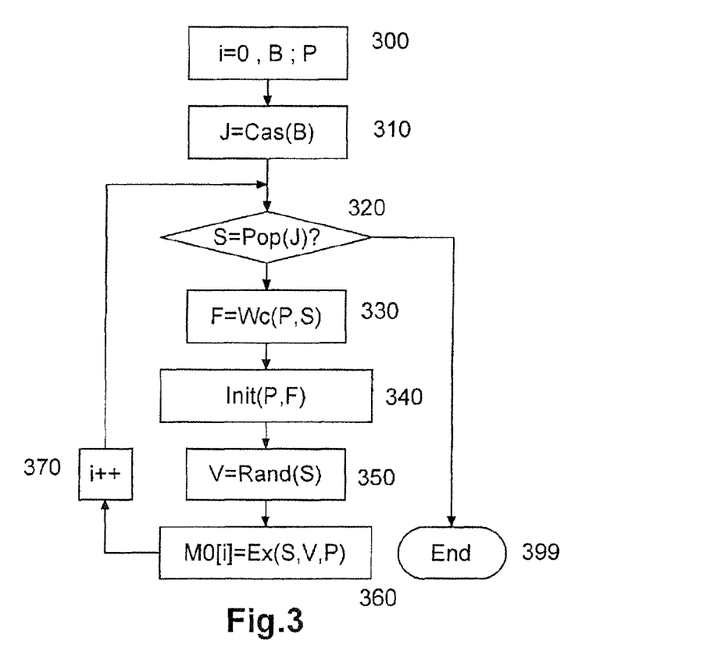
FIG. 3 represents an exemplary implementation of a function of FIG. 2.

In an operation 200, the constructor 4 executes a function Trn1( ) to calculate the worst-case execution time data set for the benchmark program for the given processor in a worst-case configuration. FIG. 3 represents an exemplary implementation of the function Trn1( ).

In an operation 300, an index i is initialized to zero, and the benchmark program B and the processor P are received.

In an operation 310, a function Cas( ) receiving the benchmark program B is executed so as to determine all possible execution cases for the benchmark program B. These possible execution cases are stored in a vector J. Accordingly, the benchmark program is cut up automatically or manually into a plurality of call blocks linked together by a sequencing graph of the benchmark program B, and the execution cases are generated taking account of the diverse hardware possibilities of execution of these call blocks, over the collection of possible combinations of call blocks within the sequencing graph of the benchmark program B. As a variant, the vector J can be received as a parameter, for example by the user.

A loop is then launched from an operation 320 in which the collection of execution cases which is scanned and executed by the processor so as to derive therefrom a worst-case execution time. Thus, in the operation 320, the vector J is popped in a variable S, and then the set of processor factors F is determined in an operation 330, the processor is initialized in an operation 340, and a vector of initialization values V is generated by a function Rand( ) which receives the variable S as argument in an operation 350. In the example described here, the function Rand( ) generates the vector of initialization values V in a random manner. As a variant, the function Rand( ) could define the vector of initialization values V by choosing it from among a group of vectors which are representative from a statistical point of view with respect to the execution case S on the processor P.

In the operation 330, a function Wc( ) receiving the processor P and the variable S as arguments is executed so as to determine a set of processor factors F corresponding to worst-case operation for the processor P in the execution case S. For example, the function Wc( ) will generate a set of processor factors in which only one of the cores is activated, with a minimum operating frequency, by deactivating the buffer memories, and by envisaging a malfunction of the communication bus on the processor. As a variant, the set of processor factors F can be received as parameter, for example by the user.

A function Init( ) is then executed in the operation 340 with the processor P and the set of processor factors F as arguments. This function accesses the processor P and configures it in accordance with the set of processor factors F. The operation 350 can be carried out after the operation 340, before the latter or in parallel.

The worst-case execution time corresponding to the variable S is determined by executing a function Ex( ) in an operation 360. The function Ex( ) executes the execution case defined by the variable S with the vector of initialization values V on the processor P initialized in the operation 340.

The resulting execution time is stored in the worst-case execution time data set M0[i], and then the index i is incremented in an operation 370 and the loop resumes with the operation 340. When all execution cases have been scanned, the function Tm1( ) terminates in an operation 399 with the return of the worst-case execution time data set M0.

The constructor 4 thereafter executes a function Trn2( ) in an operation 210 in which it determines a plurality of data sets of respective execution time to sets of processor factors chosen from a collection of sets of processor factors. As has been described above, the collection of sets of processor factors is chosen in such a way as to characterize the worst-case behavior of the processor P, in the manner of the eigenvectors of a matrix. Typically, each set of processor factors is defined by activating and/or optimizing one or more factors of the processor P, and by defining all the other factors at their worst-case value.

Figure 4:
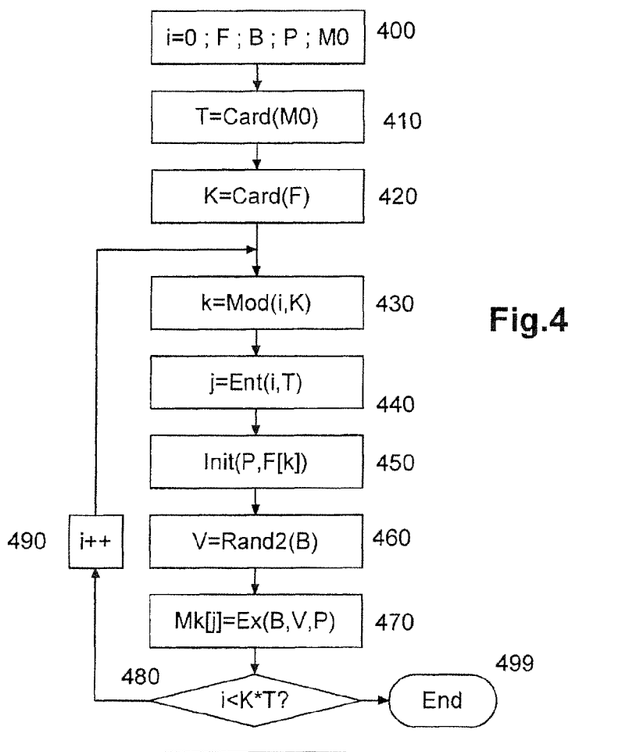
FIG. 4 represents an exemplary implementation of a function of FIG. 2.

FIG. 4 represents an exemplary implementation of the function Trn2( ).

In an operation 400, an index i is initialized to zero, and the collection of sets of processor factors F, the benchmark program B, the processor P are received, as well as the worst-case execution time data set M0. It should be noted that the collection of sets of processor factors F received in the operation 400 is distinct from that determined in the operation 330. Here, each set of factors of the collection of sets of processor factors F represents a configuration that the function is aimed at rating.

In an operation 410, a variable T is created and receives the number of execution times that are contained in the worst-case execution time data set M0. In a similar manner, in an operation 420, a variable K is created and receives the number of sets of processor factors that are contained in the collection of sets of processor factors F.

A loop is then launched in which a collection of execution time data sets M1 to MK will be generated for each set of processor factors, each execution time data set M1 to MK receiving a number, equal to the variable T, of execution times.

The index k of the set of processor factors for which an execution time must be determined for a given instance of the loop is determined in an operation 430 by calculating the index i modulo the variable K.

The index j of the execution time in the execution time data set Mk is determined for a given instance of the loop and determined in an operation 440 by calculating the integer part of the division of the index i by the variable T.

The consequence of the operations 430 and 440 is that the execution time data sets Mk are determined in an increasing manner, one execution time after another. This can be carried out in another order, provided that some randomness is retained so as not to bias the construction of the execution time data sets Mk.

Thereafter, the processor P is initialized with the set of processor factors of index kin the collection of sets of processor factors in an operation 450 similar to the operation 340, and then a vector of initialization values V is generated by applying a function Rand2( ) to the benchmark program B in an operation 460 in a similar manner to the operation 350. In the example described here, the function Rand2( ) generates the vector of initialization values V in a random manner. As a variant, the function Rand2( ) could define the vector of initialization values V by choosing it from among a group of vectors which are representative from a statistical point of view with respect to the execution case S on the processor P.

Finally, the worst-case execution time corresponding to the vector of initialization values V is determined by executing a function Ex( ) in an operation 470. The function Ex( ) executes the execution case defined by the vector of initialization values V for the benchmark program B on the processor P initialized in the operation 450.

The resulting execution time is stored in the execution time data set Mk[j], and then the index i is tested in an operation 480 so as to determine whether all the execution time data sets Mk have been calculated.

If this is not the case, then the index i is incremented in an operation 480 and the loop resumes with the operation 430. Otherwise, the function Trn2( ) terminates in an operation 499 with the return of the collection of execution time data sets M1 to MK.

The constructor 4 thereafter executes a function Fit( ) in an operation 220 in which it determines a set of coefficients alph[ ] which characterizes the correspondence between each of the execution time data sets M1 to MK with the worst-case execution time data set M0.

This is carried out by applying a Bayesian model ("Bayesian Model Averaging" in English).

According to this model, the probability distribution function of a prediction, on the basis of a plurality of models M1 to MK to explain a model M0 can be written in accordance with formula [10] of annex A.

Investigations by the Applicant have revealed that by correcting the bias of the execution time data sets M1 to MK, the latter can be rewritten in the form of predictors f1 to fK, thereby making it possible to define a conditional probability distribution function on each predictor fk, and to rewrite formula [10] in accordance with formula [20] of annex A. In this formula, each conditional probability distribution function on a predictor fk can then be approximated by means of a normal distribution centered on a linear function of the predictor fk.

The determination of the collection of normal distributions on the basis of the predictors fk then makes it possible to determine all the coefficients of the vector alph[ ]. Accordingly, the Applicant uses the likelihood function, maximizing its logarithm in accordance with the EM algorithm ("*The EM algorithm and extensions*" by Geoffrey J. McLachlan, and Thriyambakam Krishnan, 1997) which is an extension of the article "*Maximum Likelihood from Incomplete Data via the EM Algorithm*" by Dempster, Laird and Rubin in Journal of the Royal Statistical Society. Series B (Methodological), Vol. 39, No. 1. (1977), pp. 1-38. This is carried out using formula [30] of annex A.

Figure 5:
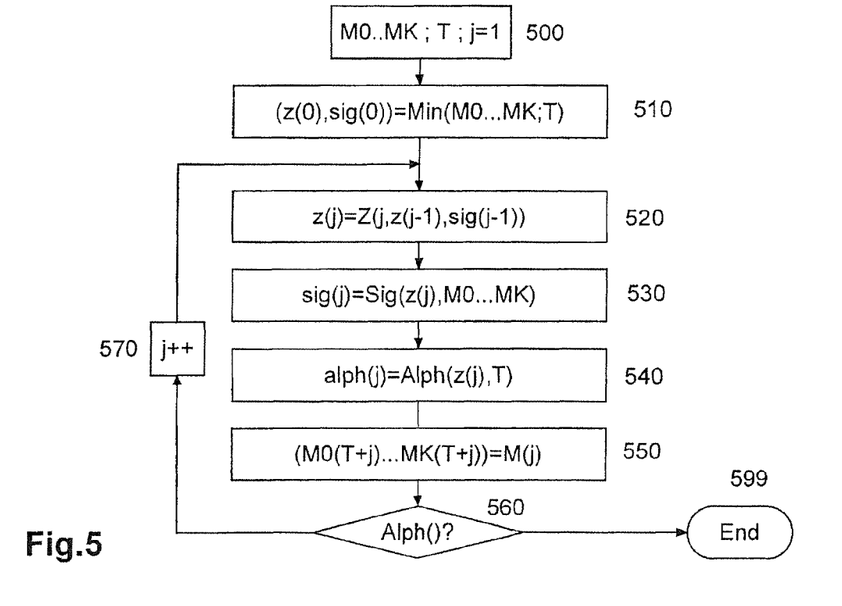
FIG. 5 represents an exemplary implementation of a function of FIG. 2.

FIG. 5 represents an exemplary implementation of the function making it possible to determine the vector alph[ ] for the execution time data sets M1 to MK with respect to the execution time data set M0.

In an operation 500, the execution time data sets M0 to MK are received, as well as the number T of data in each execution time data set, and an index j is initialized to 1.

In an operation 510, the algorithm is initialized by calculating an estimator z(0) and a variance vector sig(0) by means of a function Min( ) The function Min( ) receives the data sets M0 to MK, and, for each execution time of each set M1 to MK, defines a value that it stores in z(0) which equals 1 if an execution time of given index is the closest among all the execution times of the same index to the execution time having this same index in M0. Stated otherwise, if the sets of executions are indexed by the letter i, then z(0)(r,i) equals 1 if Mr(i) is the closest to M0(i) among all the Mk(i). All the other z(0)(k,i) are set to 0. Thereafter, the variance vector sig(0) is calculated for each k according to formula [40] of annex A, with j=0.

A loop is then launched in which the estimator z(j), the variance vector sig(j) and the vector of weights alph(j) are evaluated sequentially, and the data sets are extended by using a sliding window.

The loop begins the updating of the estimator z(j) in an operation 530. Accordingly, each z(j)(k,i) is calculated on the basis of formula [50] of annex A, where N(X,Y)(z) designates the normal distribution with mean X and variance Y, calculated as z. The index i lies between j and T+j−1, and the index k lies between 1 and K. The vector z(j) therefore contains T*K values.

The vector sig(j) is then evaluated in an operation 530 by applying formula [40] of annex A, and the vector of weights alph(j) is evaluated in an operation 540 by applying formula [60] of annex A.

The vectors sig(j) and alph(j) make it possible to define K normal distributions determined on a window of index i lying between j and T+j−1 for each of the execution time data sets Mk for k lying between 1 and K.

Finally, new execution times are determined on the basis of these estimations in an operation 550. Accordingly, a function M( ) is executed, which calculates firstly a new execution time Mk(T+j) for each k lying between 1 and K by applying formula [70] of annex A, that is to say by applying the normal distribution whose parameters have just been evaluated for the execution time window of index k whose values are those associated with the indices lying between j−1 and T+j−1, with as mean the last execution time of this window (that is to say Mk(T+j−1)), as variance the value of index k of the vector sig(j), evaluated at the point M0(T+j−1). Once the window has been extended for all k between 1 and K, the execution time data set M0 is also extended in accordance with formula [80] of annex A.

A test is then carried out in an operation 560 to determine whether the vector alph(j) is sufficiently close to the vector alph(j−1), thereby making it possible to determine that the algorithm has converged. If this is not the case, then j is incremented in an operation 570. Otherwise, the function Fit( ) then terminates by returning the set of coefficients alph[j] in an operation 599.

In the example of FIG. 5, the length of the sliding window used is equal to T, that is to say the number of elements of M0. However, this length represents a maximum and could be less. For example, the length of the sliding window could be chosen on the basis of criteria such as the Continuous Rank Probability Score (CRPS) or the Root Mean Square Error (RMSE). In this case, it will be possible for the operations 510, 530 and 550 to be adapted to a shorter length.

Figure 6:
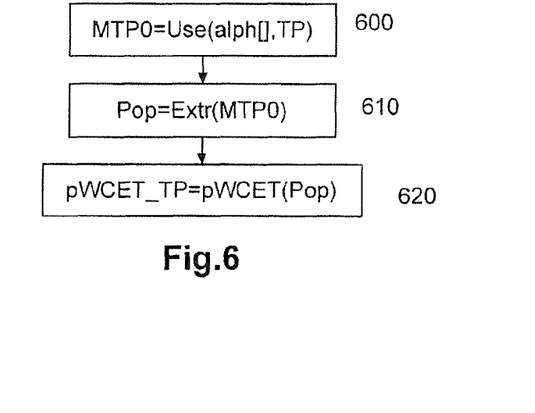
FIG. 6 represents an exemplary implementation of a function by an element of FIG. 1.

FIG. 6 represents an exemplary implementation of a function for calculating the worst-case calculation time for a program TP on the basis of the characterization which has just been undertaken. Indeed, the model of worst-case behavior M0 of the processor P having been characterized by means of the sets of factors F[1] to F[K] and of the corresponding weights alph[1] to alph[k], it becomes possible to characterize a new program TP different from the benchmark program B by testing the new program TP a number R of times with the sets of factors F[1] to F[K], while having R much smaller than the number of executions of the model M0 of the original benchmark program. Investigations by the Applicant have demonstrated that a number T=1000 or 10 000 and a number R=100 of executions suffice to obtain satisfactory results. This signifies that the invention makes it possible to reduce by an order of 100 the number of necessary program executions, with respect to the 100 000 executions of the prior art.

Thus, in an operation 600, the model of worst-case execution time for the program TP is determined by executing a function Use( ) which receives the program TP, the vector of weights alph[ ] and the sets of factors F[1] to F[K] as arguments.

Figure 7:
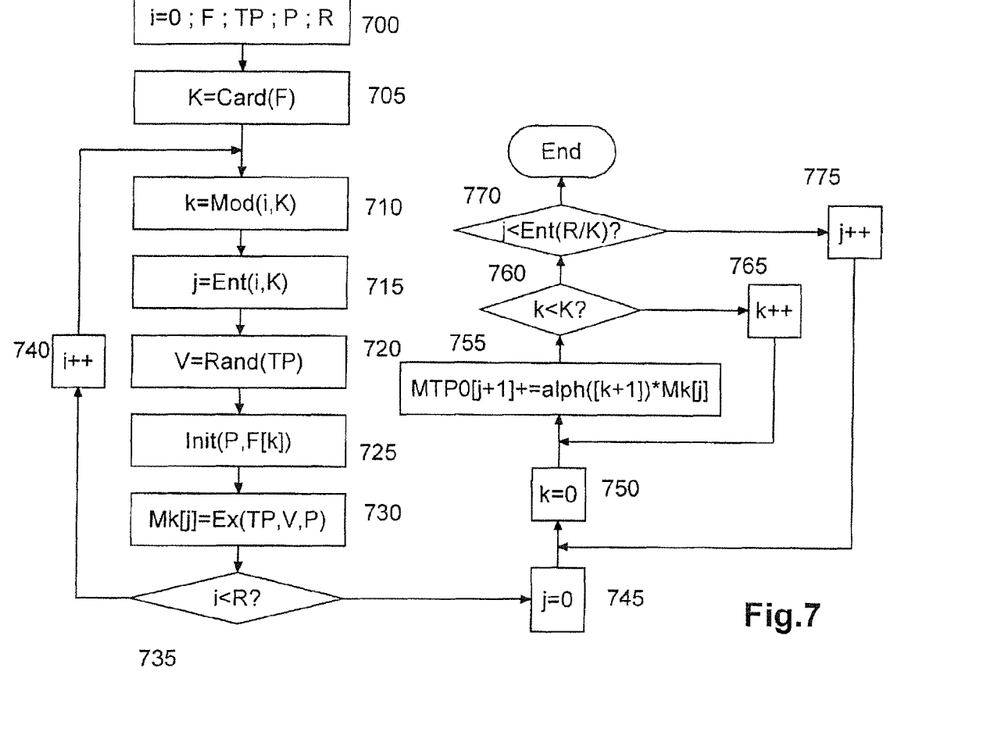
FIG. 7 represents an exemplary implementation of a function of FIG. 6.

FIG. 7 represents an exemplary implementation of the function Use( ). In an operation 700, an index i is initialized to 0, and the sets of factors F, the new program TP, the processor P and the number of executions R are received.

In an operation 705, K is determined as the number of sets of factors F. A loop is then executed to carry out R executions of the new program TP on the processor P, initialized according to each of the sets of factors F.

Accordingly, an index k is calculated in an operation 710 as the remainder of the index i modulo K, and indicates which factor set will be used. Thereafter, or in parallel, an index j is defined in an operation 715 as the integer part of the index i divided by K. This will indicate the rank of the execution time determined. In an operation 720, the function Rand( ) is executed with the new program TP to generate a vector of initialization values V, just as for the operations 350 and 460. Finally, the processor P is initialized in an operation 725 with the set of factors F[k] in an identical manner to the operations 340 and 450, and in an operation 730 the program TP is executed on the processor P initialized with the vector of initialization values V and the corresponding execution time is stored in the vector Mk[ ] at the index j.

Finally, a test of an operation 735 determines whether i is strictly smaller than R. If this is the case, then it is incremented in an operation 740. Otherwise, the new program TP has then been characterized and the worst-case model MTP0 is calculated in operations 745 to 775.

In the operation 745, the index j is reinitialized to 0. A double-loop is then launched in which each contribution of index j, derived from each set of factors, is grouped together to form a worst-case execution time of index j for the new program TP. Accordingly, the index k is initialized to 0 in the operation 750, and all the sets of factors are traversed for the given index j by adding to MTP0[j] the value Mk[j] multiplied by alph[k] in an operation 755. Thus, MTP0[j] progressively receives the contributions Mk[j] of each set of factors, a test in the operation 760 determines whether or not all the sets of factors have been scanned. If this is not the case, then the index k is incremented in the operation 765 and the loop in k resumes with the operation 755. If it is the case, then a test in the operation 770 determines whether all the rows of MTP0[ ] have been filled. If this is not the case, then the index j is incremented in the operation 775 and the loop in i resumes with the operation 750. If it is the case, then the function terminates at 799.

Thereafter, a function Extr( ) is executed in an operation 610 on the set of worst-case execution times MTP0. The function Extr( ) extrapolates additional data so as to complete the set of worst-case execution times MTP0. Accordingly, it applies the normal distributions of each set of factors F[1] to F[K] in a sliding window, as was done with the operation 550, except that the variance sig(k) is fixed for each set of factors.

Finally, in an operation 620, a function pWCET( ) calculates the worst-case execution time with a corresponding probability with the result of the operation 630. Advantageously, this function can be carried out in accordance with the teachings of French patent application FR 15 51828 or in any other suitable way.

The invention therefore makes it possible to obtain results making it possible to determine the worst-case execution times of a program by a processor on the basis of an appreciably smaller number of executions than was known previously (of the order of 1000 executions as against more than 100 000 before). This therefore makes it possible for programs to be modified more safely, since the question of their validation by processors no longer constitutes a critical problem in terms of execution time. Moreover, this also makes it possible to carry out comparison benchmarks of processors for the execution of a given program. Indeed, it becomes rapidly possible to inter-compare processors.

ANNEX A $$p(M_0) = \Sigma_{k=1}^{K} p(M_0 | M_0^T) \qquad [10]$$

$$p(M_0) = p(M_0 | f_1, \ldots, f_K) = \Sigma_{k=1}^{K} \alpha_k g_k(M_0 | f_k),$$
$$M_k \sim g_k(M_0 | f_k) \sim N(f_k, \sigma_k^2) \qquad [20]$$

$$l(\theta) = \Sigma_i log(\Sigma_{k=1}^{K} \alpha_k g_k(M_{0i} | f_{ki})) \qquad [30]$$

$$sig(j)(k)^2 = \Sigma_{i=j}^{T+j-1} (z(j)(k,i)*(M_0(i) - M_k(i))^2) /$$
$$\Sigma_{i=j}^{T+j-1} z(j)(k,i) \qquad [40]$$

$$z(j)(k,i) = N(M_k(i), sig(j-1)(k)^2)(M_0(i)) /$$
$$\Sigma_{i=j}^{T+j-1} N(M_k(i), sig(j-1)(k)^2)(M_0(i)) \qquad [50]$$

$$alph(j)(k) = \Sigma_{i=j}^{T+j-1} z(j)(k,i) / T \qquad [60]$$

$$M_k(T+j) = N(M_k(T+j-1), sig(j-1)(k)^2)(M_0(T+j-1)) \qquad [70]$$

$$M_0(T+j) = \Sigma_{k=1}^{K} alph(j)(k) M_k(T+j) \qquad [80]$$

The invention claimed is:

1. A computer device for computing a worst-case execution time by a processor (P), comprising a memory arranged to receive a benchmark program (B), sets of characterization configuration data (F[k]) each representing a configuration of the processor (P) to be rated, and sets of execution case data (S), and program data (TP) of a second program, and
   a constructor arranged to determine, for each set of execution case data (S), a set of processor factors (F) corresponding to a worst case operation of the processor (P) and a vector of initialization values (V) defining the set of execution case data (S) for the benchmark program (B), and to determine, for each set of execution case data (S), a reference execution time (M0[i]) by executing the benchmark program (B) according to the set of execution case data (S) by the processor (P) configured with the set of processor factors (F) and with the vector of initialization values (V) associated with the set of execution case data (S), the whole collection of reference execution times forming a set of reference execution times (M0),
   the constructor furthermore being arranged to determine, for each set of characterization configuration data (F[k]), a set (Mk) of characterization execution times (Mk[j]), each set (Mk) of characterization execution times (Mk[j]) comprising a number of characterization execution times (Mk[j]) which is equal to the number (T) of elements of the set of reference execution times (M0) and each characterization execution time (Mk[j]) being determined, for a vector of initialization values (V) which is representative of the benchmark program (B) and the processor (P), by executing the benchmark program (B) by the processor (P) configured with a set of characterization configuration data (F[k]) and with the vector of initialization values (V),
   the constructor furthermore being arranged to determine a set of characterization coefficients (alph[k]) by applying an algorithm for determining the maximum likelihood between the set of reference execution times (M0) and the sets of characterization execution times (Mk), the set of characterization coefficients (alph[k]) characterizing the correspondence between each set (Mk) of characterization execution times and the set of reference execution times (M0), the device being arranged to return the set of process factors (F) and the set of characterization coefficients (alph[k]),
   the computer device being configured to:
      determine (Use) a model of worst-case execution time (MPT0) for the second program based on the set of process factors (F), the program data (TP) and the set of characterization coefficients (alph[k]) returned by the constructor,
      determine (Extr), based on the set of worst-case execution time (MPT0), additional data so as to complete by extrapolation the set of worst-case execution time (MPT0), thereby forming a base of worst-case execution times, and
      calculate (pWCET) a worst-case execution time of said second program with a corresponding probability by applying a pWCET algorithm to the base of worst-case execution times (MPT0).

2. The device as claimed in claim 1, in which the constructor is arranged to calculate the characterization coefficients (alph[k]) by determining, for each set (Mk) of characterization execution times (Mk[j]), a plurality of estimators (z(0)(k)) in which, for each index (j), the value is zero or equals one if the characterization execution time (Mk[j]) of index (j) is the closest to the reference execution time (M0[j]) for this index (j) from among all the characterization execution times (M1[j] . . . MK[j]) for this index (j), as well as a variance (sig(0)(k)) for each set (Mk) of characterization execution times on the basis of the plurality of estimation vectors (z(0)(k)) and of the differences between the reference execution times (M0[i]) and the characterization execution times (Mk[i]) of identical indices,
   and thereafter by calculating iteratively on the basis of a sliding window comprising for each iteration and for each set (Mk) of characterization execution times (Mk[j]) a number of execution times which is equal to the number (T) of elements of the set of reference execution times (M0) and which are the most recent:
      a plurality of estimation vectors (z(k)(j+1)) for the current iteration, on the basis of a plurality of normal distributions for each set (Mk) of characterization execution times which have in common a variance derived from that of the previous iteration (sig(k)(j−1)), and whose mean is derived on each occasion from a characterization execution time (Mk[i]) selected by the sliding window of the current iteration, which normal distributions are each evaluated at the execution time of the set of reference execution times (M0[i]) which corresponds to that on the basis of which the mean is determined,
      a variance (sig(j)(k)) and a characteristic coefficient (alph(j)(k)) for each set (Mk) of characterization execution times (Mk[j]) on the basis of the estimator (z(j)(k)) of the current iteration, of the differences between the reference execution times (M0[i]) and the characterization execution times (Mk[i]) of identical indices selected by the sliding window of the current iteration, and the number (T) of elements of the set of reference execution times (M0),
      a new characterization execution time (Mk[T+j]) for each set (Mk) of characterization execution times by applying a normal distribution whose variance is that calculated for each set of characterization execution times for the current iteration (sig(j)(k)) and whose mean is the characterization execution time (Mk[T+j−1]) of highest index in the sliding window, which normal distribution is evaluated at the execution time of the set of reference times (M0[T+j−1]) of highest index in the sliding window, and a new reference execution time (M0[T+j]) on the basis of the new characterization execution times (Mk[T+j]) for each set (Mk) of characterization execution times and of the characteristic coefficients (alph(j)(k)) for each set (Mk) of characterization execution times (Mk[j]) for the current iteration,
   the iterations being repeated until a condition pertaining to the number of iterations or to a difference between the characterization coefficients (alph(j)(k)) for each set (Mk) of characterization execution times of consecutive iterations is fulfilled, the set of characterization coefficients (alph[k]) being defined on the basis of the characterization coefficients (alph(j)(k)) of the last iteration.

3. The device as claimed in claim 2, in which the constructor is arranged to calculate the estimators (z(j)(k)) according to the following formula:

$$z(j)(k,i) = N(M_k(i), sig(j-1)(k)^2)(M_0(i)) / \sum_{i=j}^{T+j-1} N(M_k(i), sig(j-1)(k)^2)(M_0(i))$$

where each z(j)(k,i) is an element of index i in the estimator z(j)(k), N(m,s) designates the normal distribution with mean m and variance s, $M_k(i)$ designates the execution time of index i in the k-th set (Mk) of characterization execution times, sig(j−1)(k) is the variance for the k-th set (Mk) of characterization execution times and $M_0(i)$ designates the execution time of index i in the set of reference execution times.

4. The device as claimed in claim 2, in which the constructor is arranged to calculate the variances (sig(j)(k)) according to the following formula:

$$sig(j)(k)^2 = \sum_{i=j}^{T+j-1}(z(j)(k,i)*(M_0(i)-M_k(i))^2) / \sum_{i=j}^{T+j-1}z(j)(k,i)$$

where z(j)(k,i) is the element of index i in the estimator z(j)(k) for the k-th set of characterization execution times, $M_k(i)$ designates the execution time of index i in the k-th set (Mk) of characterization execution times, and $M_0(i)$ designates the execution time of index i in the set of reference execution times.

5. The device as claimed in claim 2, in which the constructor is arranged to calculate the characterization coefficients (alph(j)(k)) according to the following formula:

$$\text{alph}(j)(k) = \sum_{i=j}^{T+j-1} z(j)(k,i)/T$$

where z(j)(k,i) is the element of index i in the estimator z(j)(k) for the k-th set of characterization execution times and T is the number of elements of the set of reference execution times M0.

6. The device as claimed in claim 2, in which the constructor is arranged to calculate the new characterization execution times (Mk(T+j)) according to the following formula:

$$M_k(T+j) = N(M_k(T+j-1), sig(j-1)(k)^2)(M_0(T+j-1))$$

where N(m,s) designates the normal distribution with mean m and variance s, Mk(i) designates the execution time of index i in the k-th set (Mk) of characterization execution times, and sig(j−1)(k) is the variance for the k-th set (Mk) of characterization execution times.

7. The device as claimed in claim 2, in which the constructor is arranged to calculate the new reference execution times (M0[T+j]) according to the following formula:

$$M_0(T+j) = \sum_{k=1}^{K} \text{alph}(j)(k) M_k(T+j)$$

where $M_0(i)$ designates the execution time of index i in the set of reference execution times, Mk(i) designates the execution time of index i in the k-th set (Mk) of characterization execution times, and alph(j)(k) is the characterization coefficient associated with the k-th set (Mk) of characterization execution times in the j-th iteration.

8. A device for calculating the base of worst-case execution times of a program by a processor (P) comprising a memory arranged to receive the program data (TP) as well as the sets of characterization configuration data (F[k]) in correspondence with the set of characterization coefficients (alph[k]) which is obtained by the execution of the device according to claim 1, and a modeler arranged to:

determine a plurality of vectors of initialization values (V) for each set of characterization configuration data (F[k]), the number (Ent(R/K)) of vectors of initialization values (V) being the same for all the sets of characterization configuration data (F[k]), determine a plurality of execution times (Mk[j]) by executing the second program by the processor (P) configured with each set of characterization configuration data (F[k]) and with on each occasion the corresponding plurality of vectors of initialization values (V), and add to the base of worst-case execution times a plurality of worst-case execution times (MTP0[j+1]), which are each equal to the sum, for each set of characterization configuration data (F[k]), of the product of one of the execution times (Mk[j]) by the characterization coefficient (alph[k]) associated with the set of characterization configuration data (F[k]) which made it possible to obtain this execution time (Mk[j]), so that the base of worst-case execution times comprises a number of execution times (MTP0[j+1]) which is equal to the number of vectors of initialization values (V) for each set of characterization configuration data (F[k]).

9. A method for computing a worst-case execution time by a processor (P), comprising the following operations:

a) receive a benchmark program (B), sets of characterization configuration data (F[k]) each representing a configuration of the processor (P) to be rated, and sets of execution case data (S), b) for each set of execution case data (S), determine a set of processor factors (F) corresponding to a worst-case operation of the processor (P) and a vector of initialization values (V) defining the set of execution case data (S) for the benchmark program (B), and determine, for each set of execution case data (S), a reference execution time (M0[i]) by executing the benchmark program (B) according to the set of execution case data (S) by the processor (P) configured with the set of processor factors (F) and with the vector of initialization values (V) associated with the set of execution case data (S), the whole collection of reference execution times forming a set of reference execution times (M0), c) for each set of characterization configuration data (F[k]), determine a set (Mk) of characterization execution times (Mk[j]), each set (Mk) of characterization execution times (Mk[j]) comprising a number of characterization execution times (Mk[j]) which is equal to the number (T) of elements of the set of reference execution times (M0) and each characterization execution time (Mk[j]) being determined, for a vector of initialization values (V) which is representative of the benchmark program (B) and of the processor (P), by executing the benchmark program (B) by the processor (P) configured with a set of characterization configuration data (F[k]) and with the vector of initialization values (V), d) determine a set of characterization coefficients (alph [k]) by applying an algorithm for determining the maximum likelihood between the set of reference execution times (M0) and the sets of characterization execution times (Mk), the set of characterization coefficients (alph[k]) characterizing the correspondence between each set (Mk) of characterization execution times and the set of reference execution time (M0), and e) return the set of processor factors (F) and the set of characterization coefficients (alph[k]), the method further comprising:

determining (Use) a model of worst-case execution time (MPT0) for a second program based on the set of process factors (F), program data (TP) of said second program and the set of characterization coefficients (alph[k]) returned by the constructor, determining (Extr), based on the set of worst-case execution time (MPT0), additional data so as to complete by extrapolation the set of worst-case execution time (MPT0), thereby forming a base of worst-case execution times, and calculating (pWCET) a worst-case execution time of said second program with a corresponding probability by applying a pWCET algorithm to the base of worst-case execution times (MPT0).

10. A method for calculating the base of worst-case execution time of a program by a processor (P) comprising the following operations:

a) receive the program data (TP) as well as the sets of characterization configuration data (F[k]) in correspondence with the set of characterization coefficients (alph[k]) which is obtained by the method as claimed in claim 9, b) determine a plurality of vectors of initialization values (V) for each set of characterization configuration data (F[k]), the number (Ent(R/K)) of vectors of initialization values (V) being the same for all the sets of characterization configuration data (F[k]), c) determine a plurality of execution times (Mk[j]) by executing the second program by the processor (P) configured with each set of characterization configuration data (F[k]) and with on each occasion the corresponding plurality of vectors of initialization values (V), and d) add to the base of worst-case execution times a plurality of worst-case execution times (MTP0[j+1]), which are each equal to the sum, for each set of characterization configuration data (F[k]), of the product of one of the execution times (Mk[j]) by the characterization coefficient (alph[k]) associated with the set of characterization configuration data (F[k]) which made it possible to obtain this execution time (Mk[j]), so that the base of worst-case execution times comprises a number of execution times (MTP0[j+1]) which is equal to the number of vectors of initialization values (V) for each set of characterization configuration data (F[k]).

* * * * *